United States Patent [19]

Simnad

[11] Patent Number: 4,493,809
[45] Date of Patent: Jan. 15, 1985

[54] URANIUM THORIUM HYDRIDE NUCLEAR FUEL

[75] Inventor: Massoud T. Simnad, La Jolla, Calif.

[73] Assignee: GA Technologies Inc., San Diego, Calif.

[21] Appl. No.: 355,361

[22] Filed: Mar. 8, 1982

[51] Int. Cl.³ .............................................. G21C 3/60
[52] U.S. Cl. ................................... 376/171; 252/636; 376/422; 376/423; 376/901
[58] Field of Search ................. 252/636; 376/422, 423, 376/901, 171

[56] References Cited

U.S. PATENT DOCUMENTS

| | | | |
|---|---|---|---|
| 3,049,486 | 8/1962 | Currier, Jr. et al. | 176/41 |
| 3,063,923 | 11/1962 | Mayer | 176/41 |
| 3,120,471 | 2/1964 | Koutz et al. | 176/41 |
| 3,154,845 | 11/1964 | Simnad | 176/41 |
| 3,197,389 | 7/1965 | Dudek et al. | 176/41 |

OTHER PUBLICATIONS

McCullough et al., "Solid Metal Hydrides as Reactor Moderators", *Nucleonics,* 14(11), (Nov. 1956), pp. 146–153.
Libowitz et al., "Actinide Hydrides", *Chem. Abstracts,* 72:17616q, (1970).

*Primary Examiner*—Deborah L. Kyle
*Attorney, Agent, or Firm*—Fitch, Even, Tabin & Flannery

[57] ABSTRACT

A nuclear fuel includes uranium dispersed within a thorium hydride matrix. The uranium may be in the form of particles including fissile and non-fissile isotopes. Various hydrogen to thorium ratios may be included in the matrix. The matrix with the fissile dispersion may be used as a complete fuel for a metal hydride reactor or may be combined with other fuels.

2 Claims, No Drawings

URANIUM THORIUM HYDRIDE NUCLEAR FUEL

BACKGROUND OF THE INVENTION

The present invention relates to nuclear fuels, and more particularly to a fuel permitting the design of small, efficient reactors suitable for remote and mobile applications.

The relatively long fuel recycling times of nuclear reactors makes them well suited as power sources in mobile units, such as ships, submarines and satellites, and in remote locations, such as the Arctic, Antarctic, deep sea bases and outer space. For example, the exploration of the deep sea bed will require ample power sources sustainable without frequent refueling.

Mobile and remote applications place a premium on reactor compactness and fuel efficiency. Volume and mass constraints in satellite and submarine design, for example, dictate the use of lightweight and compact reactors. The inconvenience of refueling such mobile units makes high fuel efficiency desirable. Fuel efficiency is also desirable from the standpoint of conservation of natural reserves of fissile materials. Similar considerations govern the design of reactors for remote locations. The cost of transporting reactors and fuel to the Arctic or a deep sea drilling facility stresses the need for small, efficient reactors.

The TRIGA reactors, developed by General Atomic Company, include a variety of small, efficient reactors. The TRIGA reactors utilize metal hydride fuels, such as U-Zr-H. These fuels may include a fine dispersion of uranium fuel throughout a zirconium hydride matrix. The zirconium hydride matrix serves as a neutron moderator as well as a matrix for the fissile fuel. The metal hydride fuels are characterized by a large prompt negative temperature coefficient of reactivity, which provides for a high degree of inherent safety. Additional safety and durability are provided because U-Zr-H does not generally react with materials employed as coolants or structural members.

There are, however, some significant limitations to the metal hydride fuels heretofore developed. For one thing, at high temperatures hydrogen dissociates from the hydride. In the case of Zr-H, the hydrogen pressure is 1 atm. at 760° C. This limits the operating temperature and the moderating ability of the metal hydride. The loss of hydrogen from the fuel matrix can also reduce the moderating efficiency of the hydride. A related problem concerns the atomic percent of hydrogen within the Zr-H matrix. Normally, Zr-H includes approximately 1.7 hydrogen atoms per zirconium atom ($ZrH_{1.7}$). Finally, the zirconium itself does not contribute in any significant positive sense to the neutronic performance of an incorporating reactor.

It is an object of the present invention to provide an improved metal hydride fuel that can be used alone or in combination with other fuels. More particularly, the present invention is directed to a fuel with improved neutronics performance, improved moderating characteristics, and an enhanced large prompt negative temperature coefficient of reactivity. It is also an object of the present invention to provide a fuel which permits the design of improved small and efficient reactors.

SUMMARY OF THE INVENTION

In accordance with the present invention, a nuclear fuel includes uranium dispersed within a thorium hydride matrix. The uranium may be in the form of particles including fissile and non-fissile isotopes. Various hydrogen to thorium ratios may be included in the matrix. The matrix with the fissile dispersion may be used as a complete fuel for a metal hydride reactor or may be combined with other fuels.

The thorium serves to bind the hydrogen moderating material while serving as fertile fuel for breeding $^{233}U$. When compared to the commonly employed U-Zr-H fuel mixture, the fuel of the present invention provides improved moderating and neutronics performance.

DESCRIPTION OF THE PREFERRED EMBODIMENTS

A fuel for a nuclear reactor includes a fissile material dispersed through a thorium hydride ($ThH_x$) matrix. The atomic ratio of hydrogen to thorium may be between about 1:1 and 3:1. Thorium dihydride, $ThH_2$, is preferred due to its relative stability at elevated temperatures. In certain lower temperature applications, $ThH_3$ or intermediate forms may be selected to provide additional hydrogen. The fertile material may be fissile uranium, preferably $^{235}U$, included in particles primarily composed of $^{238}U$.

The fuel may be formed by reacting a thorium-uranium alloy with hydrogen at elevated temperatures. The uranium content of the proposed fuel may be between about 5% and 10% and preferably about 6% so that the hydride formed by reaction of the alloy with hydrogen is primarily thorium hydride, with uranium present as a uniform dispersion of fine particles.

An important advantage of $ThH_2$ and other thorium hydrides is that the $^{232}Th$ atom can absorb a neutron to form fissile $^{233}U$. The thorium hydride thus serves as fertile material for breeding additional fuel in addition to serving the moderating and safety functions of other metal hydride fuels. As is well known, $^{232}Th$ is far more plentiful than $^{235}U$, so the provision for breeding allows for more economical reactor operation and extends the practical lifetime time of natural uranium reserves. Some of the bred $^{233}U$ fissions so as to contribute directly to the output of the incorporating reactor. As breeding progresses, the neutronic and power contribution of the bred $^{233}U$ may equal that of the $^{235}U$. The use of $ThH_2$ permits a vastly improved power per unit volume ratio. Unburned $^{233}U$ may be recovered for subsequent use by reprocessing.

Another advantage of thorium is that it is capable of bonding more hydrogen than zirconium is. Thorium forms hydrides with up to a 3:1 atomic ratio of hydrogen to thorium, whereas zirconium hydride is limited to a 2:1 ratio. Thus, the use of thorium hydride permits a greater density of hydrogen atoms. The hydrogen serves as the primary moderator in a metal hydride fuel, so the greater hydrogen density provides more effective moderation of the fission neutrons, which in turn increases the efficiency of the reactor. The additional hydrogen also may enhance the inherent safety of an incorporating reactor by enlarging the prompt negative temperature coefficient of reactivity.

Furthermore, the preferred $ThH_2$ is more stable than $ZrH_{1.7}$ at elevated temperatures. For example, tests conducted at General Atomic Company determined that the equilibrium hydrogen pressure of the $ZrH_{1.7}$ is 1 atm. at 760° C. $ThH_2$ achieves a 1 atm. equilibrium hydrogen pressure at 883° C. Due to the facts that the initial concentration of hydrogen is higher and that hydrogen is better retained, $ThH_2$ has better moderating characteristics and a larger prompt negative temperature coefficient of reactivity than $ZrH_{1.7}$.

$ThH_2$ does not react strongly with the materials and chemicals normally employed as structural members of fuel elements or as coolants, e.g., stainless steel, zirconium, $CO_2$, Na, water, or organic coolants. Consequently, even upon the breach of the cladding of a fuel element, adverse chemical interactions are avoided. This chemical inertness contributes to the safety of an incorporating reactor and permits flexibility in reactor design. Also, $ThH_2$ should exhibit excellent irradiation stability and fission product retention. $ThH_2$ has appropriate physical properties, such as high thermal conductivity and good heat capacity so as to facilitate heat transfer through and from the core.

The stability of the preferred $ThH_2$ may be enhanced by adding hydrogen to the coolant. The hydrogen can diffuse through fuel element cladding materials, such as stainless steel. The resulting partial pressure of hydrogen within the cladding increases the equilibrium level of hydrogen within the fuel matrix. A net loss of hydrogen from the matrix may be effectively eliminated by externally providing a partial hydrogen pressure equal to that of the fuel. Conveniently, the rate of hydrogen diffusion through the cladding increases with temperature for most cladding materials so that the hydrogen pressure correlates with the hydrogen pressure of the fuel.

During reactor operation, irradiation, fission transmutations and the build up of gaseous fission by-products can result in distortion of the fuel matrix and damage and/or breach of the fuel element cladding. The resistance of $ThH_2$ to the change due to fission burnup has not been determined precisely, but is expected to be quite good.

$UThH_2$ fuel may be favorably compared with $UZrH_x$ fuels. The improved moderating characteristics and neutronics performance of the $UThH_2$ fuel provide greater power per unit volume and per unit mass, given equivalent quantities of fissile uranium upon insertion of the fuel into a reactor. In other words, for a given power output specification, the $UThH_2$ permits the design of a more compact and lightweight fuel element. The reduction in fuel element size further permits reduction in the size of a reactor core, and, in turn, the size of an entire reactor. The reduction in reactor size corresponds to a reduction in reactor mass.

The inclusion of breeding material in the fuel, with little, if any, sacrifice of fuel compactness or performance provides for an extended fuel element recycling time and for more efficient utilization of natural uranium reserves. The improved compactness and fuel recycling times made possible by the fuel of the present invention allow the design of reactors especially well suited for remote and mobile applications. Many variations upon the preferred embodiments are possible. The inventive fuel may be used alone or in combination with other fuels, including other metal hydride fuels. The ratio of hydrogen to thorium can be varied, as can the ratio of uranium to thorium hydride. These and other embodiments are within the spirit and scope of the present invention.

What is claimed is:

1. A fuel for a nuclear reactor comprising between about 5 and 10 percent by weight uranium in the form of fine particles and at least about 90 percent by weight thorium hydride, having a hydrogen to thorium atom ratio of at least about 2, in which said uranium particles are dispersed, the thorium moiety being substantially entirely fertile $^{232}Th$ and the relative amounts of uranium and thorium hydride providing that during the active life of the fuel, sufficient $^{233}U$ will be bred from said thorium moiety so that said bred $^{233}U$ will contribute substantially to the neutron population the hydrogen moiety providing effective moderation of fission neutrons.

2. A method of operating a nuclear reactor having a core that includes fuel elements with nuclear fuel contained in claddings, the method comprising providing in the claddings a fuel consisting of between about 5 and about 10 percent by weight uranium in the form of fine particles and at least about 90 percent by weight thorium hydride, having a hydrogen to thorium atom ratio of at least about 2, in which said uranium particles are dispersed, the thorium moiety being substantially fertile $^{232}Th$ and the hydrogen moiety providing effective moderation of fission neutrons, cooling said core with gas containing a partial pressure of hydrogen generally equal to the hydrogen pressure of said thorium hydride at the reactor operating temperature to prevent loss of hydrogen from the fuel through said claddings, and using said fuel elements in the nuclear reactor at least for a time period sufficient for the $^{233}U$ to contribute substantially to the neutron population.

* * * * *